United States Patent
Saha et al.

(10) Patent No.: US 11,822,578 B2
(45) Date of Patent: Nov. 21, 2023

(54) MATCHING MACHINE GENERATED DATA ENTRIES TO PATTERN CLUSTERS

(71) Applicant: ServiceNow, Inc., Santa Clara, CA (US)

(72) Inventors: Prabodh Saha, Hyderabad (IN); Shambhavi Meenakshi Kamakshivalli, Hyderabad (IN); Tirumala Reddy Annem, Hyderabad (IN); Nitin Chugh, Bengaluru (IN)

(73) Assignee: ServiceNow, Inc., Santa Clara, CA (US)

( * ) Notice: Subject to any disclaimer, the term of this patent is extended or adjusted under 35 U.S.C. 154(b) by 285 days.

(21) Appl. No.: 17/192,282

(22) Filed: Mar. 4, 2021

(65) Prior Publication Data

US 2022/0284045 A1    Sep. 8, 2022

(51) Int. Cl.
| | |
|---|---|
| *G06F 16/00* | (2019.01) |
| *G06F 16/28* | (2019.01) |
| *G06F 11/07* | (2006.01) |
| *G06F 40/284* | (2020.01) |
| *G06F 16/35* | (2019.01) |

(52) U.S. Cl.
CPC ........ *G06F 16/285* (2019.01); *G06F 11/0706* (2013.01); *G06F 11/079* (2013.01); *G06F 11/0751* (2013.01); *G06F 11/0778* (2013.01); *G06F 11/0793* (2013.01); *G06F 16/35* (2019.01); *G06F 40/284* (2020.01)

(58) Field of Classification Search
CPC ............ G06F 11/0778; G06F 11/0793; G06F 11/0751; G06F 11/3003; G06F 16/285; G06F 11/3476; G06F 16/35; G06F 40/284; G06F 11/079; G06F 11/0706; G06F 40/216; G06F 17/18; G06F 11/008; G06F 18/213; G06F 18/2433; G06F 16/313; G06F 11/006; G06F 18/24323; G06F 11/3447
See application file for complete search history.

(56) References Cited

U.S. PATENT DOCUMENTS

| | | | |
|---|---|---|---|
| 10,268,750 B2 * | 4/2019 | Zhao | G06F 11/3452 |
| 2015/0254158 A1 * | 9/2015 | Puri | G06F 11/3476 |
| | | | 714/37 |
| 2016/0196174 A1 * | 7/2016 | Jacob | G06F 11/079 |
| | | | 714/37 |
| 2018/0109550 A1 * | 4/2018 | Huang | H04L 63/1425 |
| 2019/0095313 A1 * | 3/2019 | Xu | G06F 17/18 |
| 2019/0179691 A1 * | 6/2019 | Xu | G06V 30/1985 |
| 2019/0370347 A1 * | 12/2019 | Levy | G06F 16/355 |

* cited by examiner

*Primary Examiner* — Yicun Wu
(74) *Attorney, Agent, or Firm* — Van Pelt, Yi & James LLP (57) ABSTRACT

Machine generated data entries are received. The machine generated data entries are clustered into a plurality of different clusters that each includes a different subset of the received machine generated data entries. For each of the plurality of different clusters, content of the corresponding subset of the received machine generated data entries belonging to the corresponding cluster of the plurality of different clusters is analyzed to determine a corresponding pattern of the corresponding cluster. A new machine generated data entry is received. The new machine generated data entry is matched to one of the determined patterns. The new machine generated data entry is assigned to one of the plurality of different clusters corresponding to the matched pattern.

20 Claims, 6 Drawing Sheets

MATCHING MACHINE GENERATED DATA ENTRIES TO PATTERN CLUSTERS

BACKGROUND OF THE INVENTION

Machine generated data is information that is automatically generated by a computer process, application, or other mechanism without the active intervention of a human. Machine generated data has no single form. Rather, the type, format, metadata, and frequency vary according to the purpose of the data. Machines often create the data on a defined time schedule or in response to a state change, action, transaction, or other event. Examples of machine generated data include: various types of computer logs, financial and other transaction records, and sensor recordings and measurements. Owners and users of machine generated data can be overwhelmed by the oftentimes voluminous nature of such data. Thus, it would be beneficial to develop techniques directed toward improving management of machine generated data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Machine generated data entries are received. The machine generated data entries are clustered into a plurality of different clusters that each includes a different subset of the received machine generated data entries. For each of the plurality of different clusters, content of the corresponding subset of the received machine generated data entries belonging to the corresponding cluster of the plurality of different clusters is analyzed to determine a corresponding pattern of the corresponding cluster. A new machine generated data entry is received. The new machine generated data entry is matched to one of the determined patterns. The new machine generated data entry is assigned to one of the plurality of different clusters corresponding to the matched pattern.

A practical and technological benefit of the techniques disclosed herein is increased productivity of users of machine generated data as a result of automated pattern extraction reducing dimensionality of a large volume of machine generated textual data. The techniques disclosed herein allow users to extract patterns out of a large volume of textual data, which aids in visualizing the data, identifying highest occurring patterns, and building other applications using these patterns. The techniques disclosed herein solve the technological problem of automatically converting large amounts of textual data into a manageable form for human interpretation. Approaches that do not utilize the techniques disclosed herein are deficient because resulting data would be too unorganized to be reasonably interpreted and utilized.

Examples of textual data include: various types of computer logs, financial and other transaction records, and sensor recordings and measurements. Within an information technology (IT) context, examples of textual data include: error and/or warning logs, workflow outputs, scratch pad comments, IT tickets, etc. As used herein, a log refers to a record of an event, status, performance, and so forth. Unless otherwise specified, logs refer to records of errors and/or warnings associated with IT hardware and/or software assets. Workflow outputs are associated with a workflow analyzer that can be utilized to predict whether a workflow activity that is planned will fail or not (e.g., by comparing the workflow activity to prior workflow activities). Workflow activities are computer generated actions (e.g., report generation, computer script activation, and transmittal of computer alerts to users). A scratch pad is a common, global object that is shared by workflow activities (e.g., to share data). IT tickets refer to requests by users for assistance with computer asset repair, maintenance, upgrade, etc.

In some embodiments, the techniques disclosed herein are applied to monitoring error/warning logs, such as those stored on a management, instrumentation, and discovery (MID) server. A large number of errors/warnings can be monitoring by clustering them. As used herein, clustering refers to grouping a set of objects in such a manner that objects in the same group, called a cluster, are more similar, in one or more respects, to each other than to objects in other groups. Clustering can be a component of classification analysis, which involves identifying to which of a set of categories a new observation belongs. In various embodiments, in the IT context, clustering involves dimensionality reduction due to removing log parts, such as Internet Protocol (IP) address, configuration item (CI) name, system identifier, unique user identifier, etc., that are not relevant to the substance of errors/warnings. As used herein, a CI refers to a hardware or software asset. A CI is a service component, infrastructure element, or other item that needs to be managed to ensure delivery of services. Examples of CI types include: hardware/devices, software/applications, communications/networks, and storage components. In some embodiments, the techniques disclosed herein are applied to monitoring logs (e.g., analyzing logs to classify and organize them). In some embodiments, the techniques disclosed herein are applied to predicting workflow activity outcomes based on pattern extraction (e.g., patterns extracted from logs, workflow output, scratchpads, etc.). Workflow activity outcome (e.g., probability of success) can be calculated based on the occurrence of patterns which occur in failed and successful workflow activities.

In various embodiments, input is received in the form of a collection of textual data (e.g., logs, comments/work notes, workflow output, and scratchpad output) and a pattern is extracted. In some embodiments, as described in further detail herein, pattern extraction includes pre-processing input data (e.g., using regular expression (RegEx) handling to remove words that could skew clustering, such as removing alphanumeric words in order to remove CI names), tokenizing text, building term frequency-inverse document frequency (TD-IDF) vectors, building a Euclidean distance matrix using the TD-IDF vectors, employing a clustering algorithm (e.g., k-means) on the distance matrix to cluster the input data, determining a longest common substring (LCS) for each cluster once the input data is grouped into clusters, and automatically classifying new textual data based on the determined LCSs (e.g., based on string matching). A regular expression is a sequence of characters that define a search pattern, and in many scenarios, the search pattern is used to perform operations on strings, e.g., find or find and replace operations. The techniques disclosed herein are also generally applicable to pattern recognition and database management (e.g., sorting user information in a database, determining an applicable product, such as advertising, movie, or television show, for a user, etc.).

Figure 1:
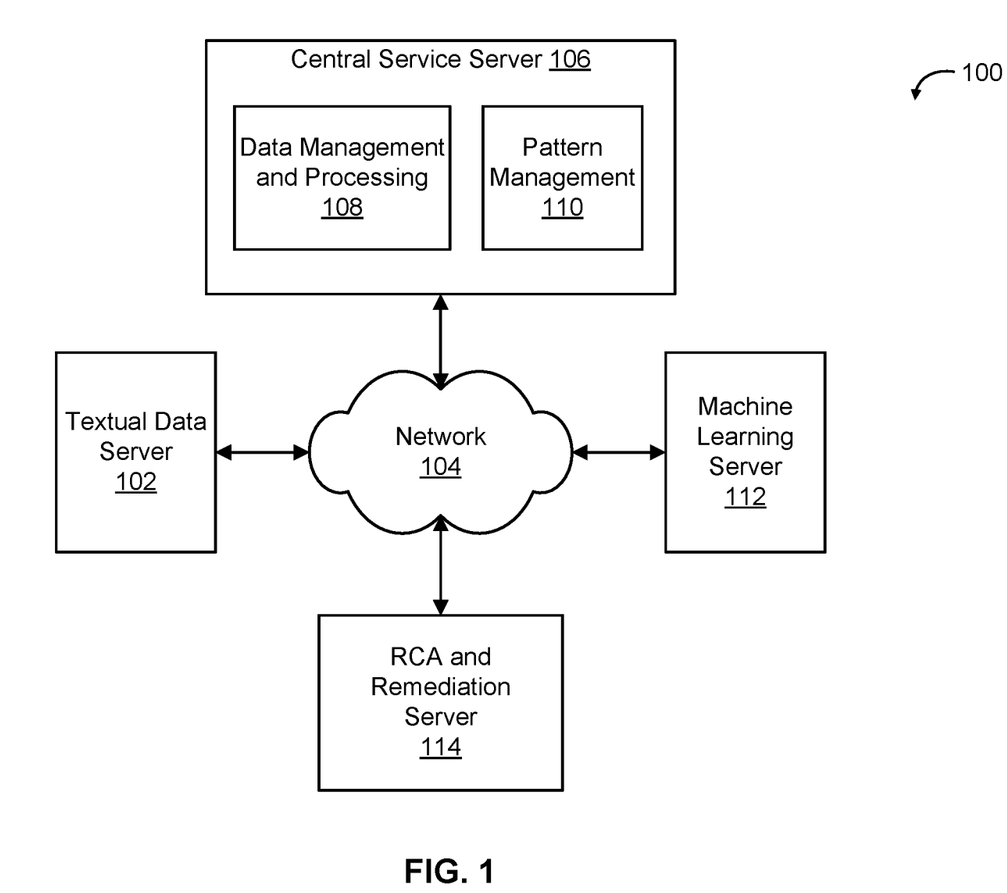
FIG. 1 is a block diagram illustrating an embodiment of a system for managing machine generated data.

FIG. 1 is a block diagram illustrating an embodiment of a system for managing machine generated data. In the example shown, system 100 includes textual data server 102, network 104, central service server 106, machine learning server 112, and RCA and remediation server 114.

In various embodiments, textual data server 102 manages and stores textual data utilized by system 100. Examples of textual data that may be managed and stored include: various types of IT machine generated data entries (e.g., error and/or warning logs, workflow outputs, scratch pad comments, IT tickets, etc.), financial and other transaction records, and sensor recordings and measurements. In some embodiments, textual data server 102 stores and manages error and warning logs. Textual data server 102 may be a distributed log store that includes several hardware and/or software components that are communicatively connected. In various embodiments, textual data server 102 includes one or more computers or other hardware components that provide log collection and storage functionality. Textual data server 102 houses textual data, potentially from many sources, and provides the data to other servers, e.g., central service server 106.

Textual data server 102 may be a MID server. The MID server can be a Java application that runs as a Windows service or UNIX daemon on a server in a user's local computer network. In some embodiments, the MID server facilitates communication and movement of data between a user's local computer network and a remote system. IT operation management can utilize the MID server to obtain data or perform operations in the user's local computer network. The MID server can act as an access/entry point behind a firewall protecting the user's local computer network with which the remote system can interface. Operations can be performed in the MID server by coding "JavaScript script includes" (computer program content to be executed by the MID server) that are deployed to the MID server. Upon receiving requests from specified software agents, in specified forms and/or patterns, or through specified interfaces, such as a cloud application programming interface (CAPI), the MID server can execute script includes to perform operations and return results. In some embodiments, the MID server includes a software portion (e.g., a Java application that runs as a Windows service or UNIX daemon) as well as a hardware portion (e.g., a physical server, such as a computer or other hardware component) that runs the software portion. In some embodiments, the MID server is a virtual machine running on a physical machine. In some embodiments, the MID server is configured for a proxy role including by running a portion of an application that is also running on a remote system. In some embodiments, logs are stored on a storage device of a hardware portion of the MID server (e.g., a hard disk drive, a solid-state drive, etc.).

In the example illustrated, textual data server 102, central service server 106, machine learning server 112, and RCA and remediation server 114 are communicatively connected via network 104. Examples of network 104 include one or more of the following: a direct or indirect physical communication connection, mobile communication network, Internet, intranet, Local Area Network, Wide Area Network, Storage Area Network, and any other form of connecting two or more systems, components, or storage devices together.

In various embodiments, central service server 106 comprises one or more hardware (e.g., computer) components capable of receiving, storing, and processing data (e.g., textual data). In the example illustrated, central service server 106 includes data management and processing 108 and pattern management 110. In various embodiments, data management and processing 108 includes one or more hardware and/or software components capable of receiving textual data from textual data server 102, storing the textual data, sending the textual data (e.g., to machine learning server 112), modifying and reorganizing the textual data (e.g., group into clusters), receiving new textual data, comparing the new textual data with previously stored and processed textual data, and storing and otherwise processing the new textual data. In various embodiments, pattern management 110 stores patterns associated with clusters of textual data. As described in further detail herein, LCS is a type of pattern that may be stored. In various embodiments, an attempt is made to classify the new textual data that is received based on patterns stored in pattern management 110. In various embodiments, pattern management 110 includes storage functionality (e.g., via a computer memory, hard disk drive, solid-state drive, etc.).

In various embodiments, machine learning server 112 comprises one or more hardware (e.g., computer) components, as well as supporting software components, capable of providing machine learning services. Machine learning refers to the use and development of computer systems that are able to learn and adapt without following explicit instructions, e.g., by using algorithms and statistical models to analyze and draw inferences from patterns in data. As used herein, machine learning includes clustering. Clustering is an example of utilizing numerical methods to analyze and draw inferences from patterns in data. In various embodiments, machine learning server 112 is requested by central service server 106 to provide quantitative analysis of textual data, including pattern extraction. In various embodiments, pattern extraction performed by machine learning service 112 includes tokenizing textual data, generating TD-IDF vectors, performing clustering (e.g., k-means clustering based on Euclidean distance), and determining LCSs. The above list is merely illustrative and not restrictive. Machine learning service 112 is a generic service that services many types of textual data and can be adapted to perform different workflows for different types of data. It is also possible for one or more processing steps to be performed by another server (e.g., by central service server 106) for computational efficiency reasons. It is also possible for the functionality of machine learning server 112 to be directly incorporated into central service server 106. An advantage of such an implementation is reduced communication latency and overhead.

In various embodiments, RCA and remediation server 114 comprises one or more hardware (e.g., computer) components, as well as supporting software components, capable of providing error/warning root cause analysis (RCA) and remediation services. It is also possible for there to be a separate RCA server and a separate remediation server that are distinct but communicatively connected. RCA is a systematic process for finding and identifying a root cause of a problem or event. Remediation refers to fixing, reversing, stopping, etc. identified problems or events, e.g., for software and hardware. An example of a problem is unresponsive software. Example remediation actions for unresponsive software (e.g., an unresponsive process) include stopping the process (e.g., pausing the process and continuing it later), ending the process (e.g., terminating the application to which the process belongs), killing the process (e.g., forcing closure without cleaning up temporary files associated with the process), and restarting the device/server on which the process is running. Examples of hardware problems include power supply problems, hard drive failures, overheating, connection cable failures, and network connectivity problems. Example remediation actions include updating hardware configurations, restarting devices/servers, and dispatching a technician to physically attend to the hardware (e.g., by replacing the hardware). In some embodiments, RCA and remediation server 114 utilizes information stored in central service server 106 to assist with RCA and remediation of IT problems. In many scenarios, a large volume of errors/warning makes RCA and remediation too time-consuming and infeasible. By clustering the large volume of errors/warnings, RCA and remediation can be feasible as a result of reduced dimensionality of data to analyze.

In some embodiments, the frequencies of error patterns are determined and the most common error patterns, corresponding to the most common errors, are addressed first. This is particularly advantageous when maintaining a large cloud infrastructure (e.g., distributed across the world) in which errors may be discovered across tens of thousands of servers and hundreds of thousands of sub-systems. Very large numbers of errors may be collected, which is why clustering is useful. If an error is remediated at one location, errors at other locations may be resolved automatically. Commonalities between errors that are identified as a result of pattern extraction can help avoid redundant work. In various embodiments, pattern extraction performed by machine learning server 112 and managed by central service server 106 aids tasks performed by RCA and remediation server 114. In various embodiments, various mappings associated with extracted patterns can be performed. For example, with respect to error patterns, a first occurred date, last occurred date, number of occurrences, CIs that are affected, and other attributes can be determined and stored. These attributes can then be viewed in a user interface (UI). In various embodiments, the UI has different modes, and it is possible to sort errors according to error pattern (e.g., LCS) or CIs affected. For example, a top error pattern can be clicked on to determine which CIs to investigate.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional textual data servers may exist. The number of components and the connections shown in FIG. 1 are merely illustrative. Components not shown in FIG. 1 may also exist.

Figure 2:
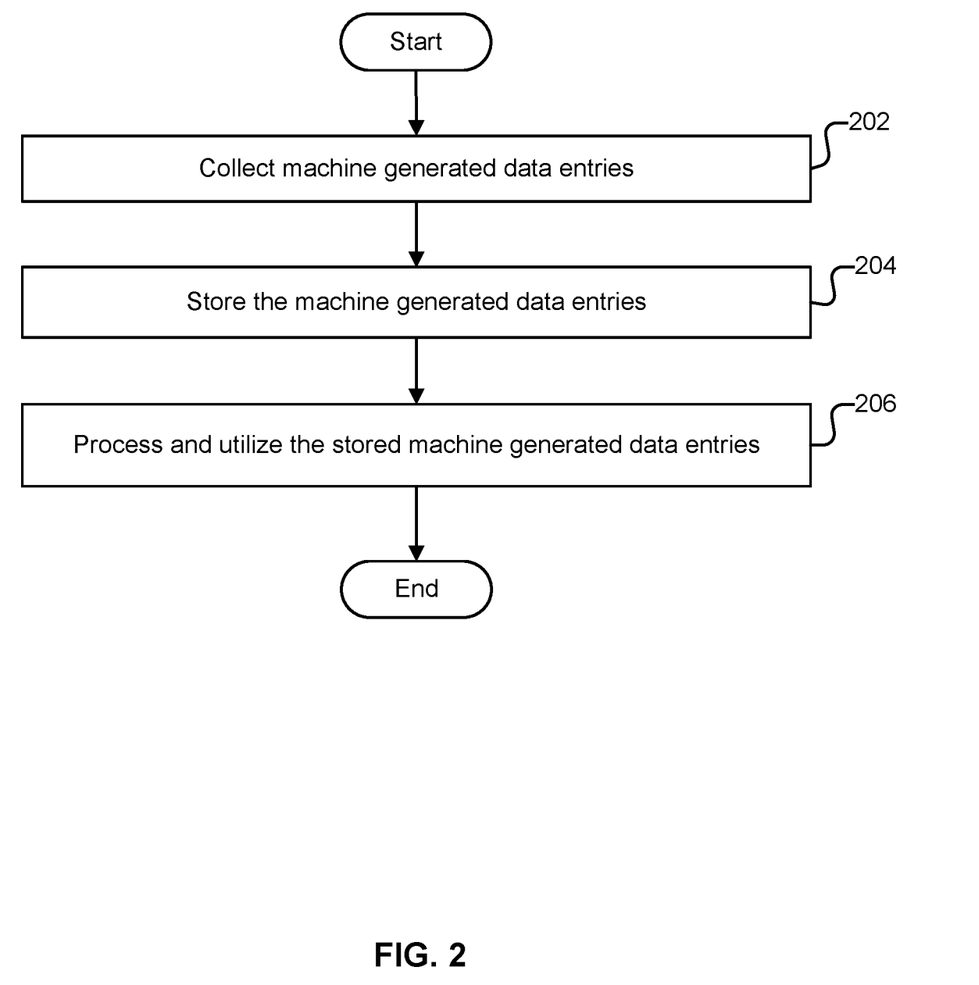
FIG. 2 is a flow chart illustrating an embodiment of a process for managing machine generated data.

FIG. 2 is a flow chart illustrating an embodiment of a process for managing machine generated data. In some embodiments, the process of FIG. 2 is performed by system 100 of FIG. 1.

At 202, machine generated data entries are collected. In some embodiments, the machine generated data entries comprise textual data. In some embodiments, the textual data comprise error and/or warning information associated with IT assets. In some embodiments, the machine generated data entries are provided by textual data server 102 of FIG. 1 to central service server 106 of FIG. 1. In various embodiments, the machine generated data entries do not fall under any already determined pattern. Thus, pattern extraction would be useful to perform on the collected machine generated data entries.

At 204, the machine generated data entries are stored. In some embodiments, the machine generated data entries are stored on central service server 106 of FIG. 1. In various embodiments, a specified storage designation is utilized for machine generated data entries without an already determined pattern. For example, the machine generated data entries can be stored with a code such as "error_no_pattern". In some embodiments central service server 106 of FIG. 1 performs pre-processing (e.g., handling problematic characters in textual data) on the machine generated data entries. It is also possible for a machine learning service to perform the pre-processing. Pre-processing is described in further detail herein.

At 206, the stored machine generated data entries are processed and utilized. In various embodiments, processing includes requesting a machine learning service to extract patterns associated with the machine generated data entries. In some embodiments, the machine learning service resides on machine learning server 112 of FIG. 1. In various embodiments, the processing includes tokenization, TD-IDF vector generation, clustering (e.g., k-means), and pattern (e.g., LCS) generation. Processing of machine generated data entries is described in further detail herein. In some embodiments, machine learning server 112 of FIG. 1 generates and then sends patterns back to central service server 106 of FIG. 1, which adds the patterns to a pattern definitions table. In some embodiments, storage and management of the machine generated data entries for which patterns are generated is handled by data management and processing 108 of central service server 106. In some embodiments, a pattern definitions table is stored in and/or managed by pattern management 110 of central service server 106. As described in further detail herein, in some embodiments, patterns in the pattern definitions table are utilized to determine to which cluster group a new machine generated data entry belongs. Such a determination may be used for error analysis and remediation (e.g., by RCA and remediation server 114 of FIG. 1).

Figure 3:
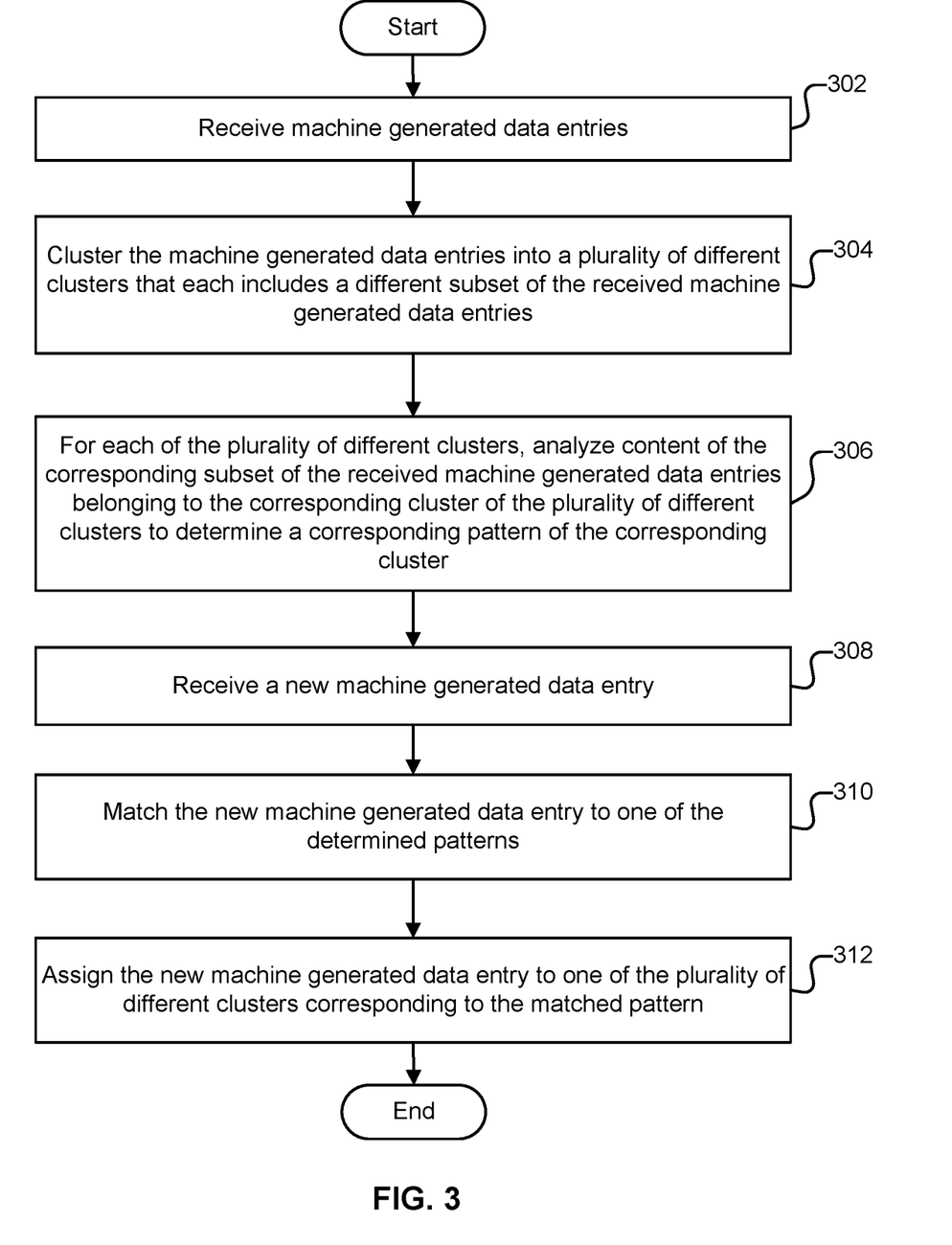
FIG. 3 is a flow chart illustrating an embodiment of a process for matching a machine generated data entry to a pattern associated with a cluster.

FIG. 3 is a flow chart illustrating an embodiment of a process for matching a machine generated data entry to a pattern associated with a cluster. In some embodiments, the process of FIG. 3 is performed by central service server 106 and machine learning server 112 of FIG. 1. In some embodiments, at least a portion of the process of FIG. 3 is performed in 206 of FIG. 2.

At 302, machine generated data entries are received. In various embodiments, the machine generated data entries comprise textual data. In some embodiments, the textual data comprise error and/or warning information associated with IT assets. In some embodiments, the machine generated data entries arrive from textual data server 102 of FIG. 1 to central service server 106 of FIG. 1 and are shared with machine learning server 112 of FIG. 1. In various embodiments, the machine generated data entries do not fall under any already determined pattern. Thus, pattern extraction would be useful to perform on the received machine generated data entries.

At 304, the machine generated data entries are clustered into a plurality of different clusters that each includes a different subset of the received machine generated data entries. In various embodiments, clustering the machine generated data entries includes tokenizing and pre-processing the entries, determining a numerical representation for each of the entries, and grouping the entries based on the determined numerical representations (e.g., based on calculating distances between entries derived from the determined numerical representations and identifying entries that are a close distance to one another).

At 306, for each of the plurality of different clusters, content of the corresponding subset of the received machine generated data entries belonging to the corresponding cluster of the plurality of different clusters is analyzed to determine a corresponding pattern of the corresponding cluster. Stated alternatively, after clustering, within each cluster, a pattern associated with that cluster is extracted. In some embodiments, the pattern is an LCS associated with that cluster. In various embodiments, the pattern is extracted from original textual data that is neither pre-processed nor tokenized.

At 308, a new machine generated data entry is received. In various embodiments, the new machine generated data entry is of the same general type as the machine generated data entries that have been clustered into the plurality of different clusters. For example, if at 302 and 304, error and/or warning log text entries have been received and clustered, then the new machine generated data entry is also an error and/or warning log text entry. In some embodiments, the new machine generated data entry is received by central service server 106 of FIG. 1 from textual data server 102 of FIG. 1.

At 310, the new machine generated data entry is matched to one of the determined patterns. Stated alternatively, the patterns determined at 306 are utilized to identify a cluster of the plurality of different clusters to which to assign the new machine generated data entry. For example, for LCS patterns, it is determined whether any existing LCS corresponding to any cluster in the plurality of different clusters matches to (can be found in) the new machine generated data entry (e.g., by performing string matching).

At 312, the new machine generated data entry is assigned to one of the plurality of different clusters corresponding to the matched pattern. For example, if the new machine generated data entry is an error and/or warning log text entry that is matched to a specific LCS, then that error and/or warning log text entry is assigned to the corresponding cluster for the specific LCS. Thus, an appropriate cluster for the new machine generated data entry is determined without needing to perform re-clustering combining the new machine generated data entry with the previously clustered machine generated data entries. A significant advantage of this is computational speed because the new machine generated data entry can be correctly classified without performing computationally time-consuming re-clustering. This improves the efficiency and functioning of a processor (e.g., a computer) performing the process of FIG. 3. Any approach that requires re-clustering would be deficient because it would be computationally slower.

Figure 4:
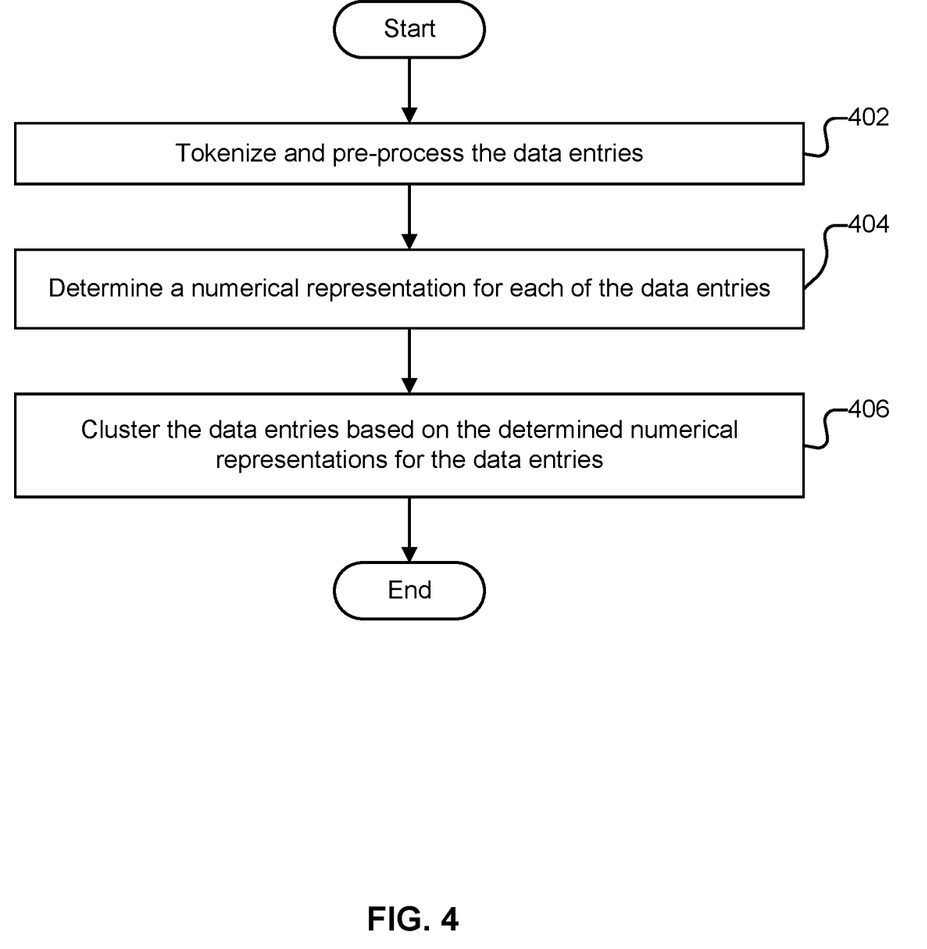
FIG. 4 is a flow chart illustrating an embodiment of a process for clustering machine generated data entries.

FIG. 4 is a flow chart illustrating an embodiment of a process for clustering machine generated data entries. In some embodiments, the process of FIG. 4 is performed by machine learning server 112 of FIG. 1. In some embodiments, at least a portion of the process of FIG. 4 is performed in 304 of FIG. 3.

At 402, data entries are tokenized and pre-processed. In various embodiments, the data entries are machine generated data entries. In various embodiments, the data entries comprise textual data (e.g., error and/or warning information associated with IT assets). It is possible for each data entry to be a single error/warning message or a combination of multiple error/warning messages (e.g., multiple error/warning messages from a common log file). Tokenization refers to demarcating and potentially classifying sections of a string of input characters. Stated alternatively, during tokenization, textual data is separated and sub-divided into individual lexical units. In some embodiments, tokenization is performed by regarding a block of text as tokens separated by specified delimiters (e.g., blank spaces, periods, slashes, numerical values, specific character sequences, etc.) that define boundaries of tokens. As used herein, tokens may also be referred to as word tokens. In some embodiments, textual data is tokenized by using primarily space characters as delimiters.

In some embodiments, pre-processing includes converting characters to lowercase or uppercase, removing punctuation, removing numbers, removing non-alphabetic (e.g., special) characters, and/or removing alphanumeric words. Punctuation, numbers, and special characters are oftentimes not relevant to the type of error for an error message. Alphanumeric words are oftentimes proper nouns (e.g., CI names) that are also not relevant to the type of error for an error message and could skew TD-IDF analysis (e.g., by assigning too much weight to proper nouns). Suppose an error/warning data entry as follows: "Server15B is low on storage, 80% full." Tokenization and pre-processing would remove the CI name "Server15B" and "80%". What remains is the type of error/warning, which is "low on storage". In some embodiments, RegEx matching is utilized to determine whether a token is a proper noun. For example, RegEx matching can be used to remove URLs by identifying strings with the pattern "https:". RegEx can also be utilized on entire data entries (e.g., entire error/warning messages). RegEx is most effective when the data entries, or parts thereof (e.g., CI names) are known a priori to follow a specified structure. RegEx can also be combined with specified rules. For example, for error/warning messages, a rule may be that any tokens that include "err" or "warn" are kept.

In some embodiments, pre-processing follows tokenization. It is also possible to perform pre-processing before tokenization. For example, it is possible to use a combination of rules and RegEx to filter out unwanted characters (e.g., numbers and special characters) so that only blank space delimiters are needed for tokenization. It is also possible to pre-process, tokenize, and then perform some additional processing (e.g., remove certain numbers and special characters, tokenize based on blank space delimiters, and then remove proper nouns, such as CI names). It is also possible to split pre-processing and tokenization tasks across services. For example, some pre-processing may be performed by central service server 106 of FIG. 1 and tokenization and/or additional processing may be performed by machine learning server 112 of FIG. 1.

At 404, a numerical representation is determined for each of the data entries. In various embodiments, the numerical representation is a vector of numbers. Numerical representations can be utilized by a clustering algorithm to quantitatively compare data entries corresponding to the numerical representations. Unless otherwise indicated, as used hereafter in reference to the process of FIG. 4, token refers to any token determined after pre-processing/processing to remove numbers, special characters, proper nouns, and any other unwanted characters or words. In various embodiments, the numerical representation is a vector for which each value is a specified metric computed for each token of a data entry. In some embodiments, the metric is TD-IDF. Stated alternatively, in some embodiments, a TD-IDF value is computed for each token of each data entry. The vectors for all the data entries comprise a document term matrix. Computations (e.g., distance calculations) can be performed on the vectors collectively by performing them on the document term matrix.

In various embodiments, for each token in a data entry, a term frequency (TD) of the token in the data entry is calculated. In some embodiments, TD is calculated as the number of times the token appears in the data entry divided by the total number of tokens in the data entry. In addition, an inverse document frequency (IDF) of the token is determined. IDF measures frequency of the token in other data entries. In some embodiments, IDF is calculated as a logarithm of a quotient, wherein the quotient is the total number of data entries divided by the number of data entries that include the token. For example, if the token appears in all data entries, IDF is equal to log(1)=0. In various embodiments, a TD-IDF score (also referred to as a TD-IDF value) is computed as TD multiplied by IDF. Other formulations for TD and IDF (and thus TD-IDF, e.g., adjusting TD for data entry length and different weighting schemes for TD and IDF) are also possible. A common feature across various formulations is that the TD-IDF score increases proportionally to the number of times the token appears in a current data entry and is offset by the number of data entries in which the token appears, which deemphasizes tokens that appear more frequently in general.

As an example, in the error/warning message "low on storage", the number of times "low" occurs in a log of error/warning messages can be associated with TD and IDF can be associated with how often "low" occurs across all logs. Words specific to a particular log are weighted more heavily. If this error message is supplied to a clustering algorithm, it will be a shorter distance to other error messages that have similar tokens. In addition, very common tokens will not factor heavily into distance comparisons by the clustering algorithm.

It is also possible to utilize a metric other than TD-IDF. In general, any transformation of a token (in text) format to a numerical format may be utilized. For example, a neural network or other machine learning model can be trained to map a collection of words (e.g., a corpus of words that are used in an IT error/warning context) to numbers or vectors, wherein words that are semantically similar map to similar numbers or vectors. Such a neural network (or other machine learning model) is trained using training example words whose semantic closeness is already known.

At 406, the data entries are clustered based on the determined numerical representations for the data entries. In various embodiments, distances between vectors corresponding to the different data entries are calculated according to a specified distance metric. In some embodiments, the distance metric is Euclidean distance. Other distance metrics are also possible. Examples of other distance metrics include Manhattan distance, Minkowski distance, and Hamming distance. The data entries are clustered based on the distance metric. In some embodiments, k-means clustering is applied to the determined numerical representations (e.g., vectors) to cluster the data entries. Other clustering approaches are also possible. Examples of other clustering approaches include mean-shift clustering, expectation-minimization clustering using gaussian mixture models, agglomerative hierarchical clustering, and density-based spatial clustering of applications with noise (DBSCAN).

Figure 5:
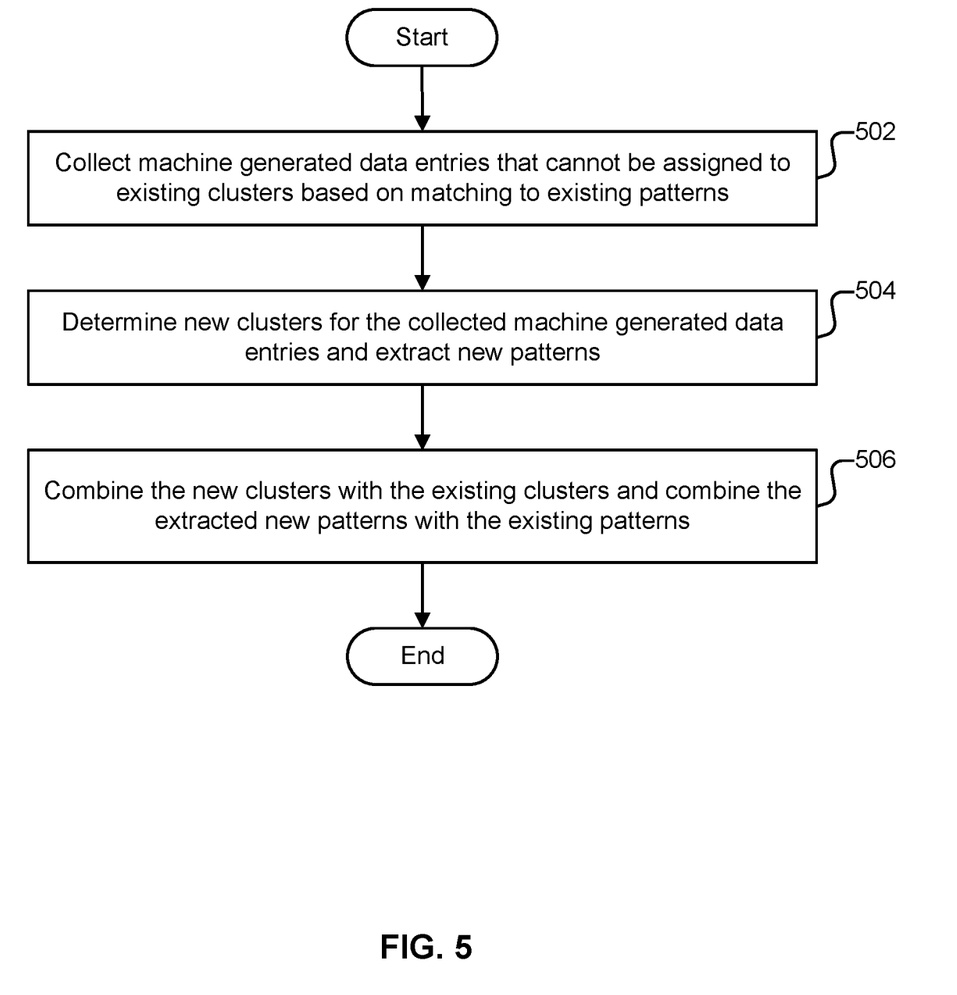
FIG. 5 is a flow chart illustrating an embodiment of a process for performing supplemental clustering of new machine generated data entries.

FIG. 5 is a flow chart illustrating an embodiment of a process for performing supplemental clustering of new machine generated data entries. In some embodiments, the process of FIG. 5 is performed by system 100 of FIG. 1. In some embodiments, the process of FIG. 5 is performed after the process of FIG. 2.

At 502, machine generated data entries that cannot be assigned to existing clusters based on matching to existing patterns are collected. In some embodiments, these (additional) machine generated data entries are provided by textual data server 102 of FIG. 1 to central service server 106 of FIG. 1. These newly collected machine generated data entries have the same general format as existing machine generated data entries that have been received and clustered (e.g., textual data, such as error/warning messages) but do not fall under any already determined pattern. For example, there may be no already extracted LCSs that match the newly collected machine generated data entries. Thus, pattern extraction would be useful to perform on the newly collected machine generated data entries. In various embodiments, the newly collected machine generated data entries are stored and consolidated (e.g., until a specified number of entries are collected or after a specified amount of time, such as a day, a week, etc., has passed) in preparation for clustering.

At 504, new clusters for the collected machine generated data entries are determined and new patterns are extracted. Clustering and pattern extraction (a new round) are needed because the collected machine generated data entries cannot be assigned to existing clusters based on matching to existing patterns. This occurs in a scenario, for example, when new types of textual data (e.g., new error/warning messages)

occur. In some embodiments, the process of FIG. 4 is utilized to cluster the collected machine generated data entries. In various embodiments, previously clustered machine generated data entries are not included in the new round of clustering, which has a benefit of saving computation time. Preexisting clusters need not be considered because it is already known that the corresponding patterns (e.g., LCSs) of the preexisting clusters do not match the new data entries. In some embodiments, the extracted new patterns are LCSs corresponding to the new clusters of the newly collected machine generated data entries.

At 506, the new clusters are combined with the existing clusters and the extracted new patterns are combined with the existing patterns. In some embodiments, the new clusters are stored with the existing clusters on central service server 106 of FIG. 1. In some embodiments, the extracted new patterns are stored with the existing patterns on central service server 106 of FIG. 1 (e.g., added to a pattern definitions table of pattern management 110 of FIG. 1). After the extracted new patterns are stored, future occurrences of machine generated data entries that are similar to the ones that have been newly clustered can be matched to the corresponding patterns that have been newly stored.

Figure 6:
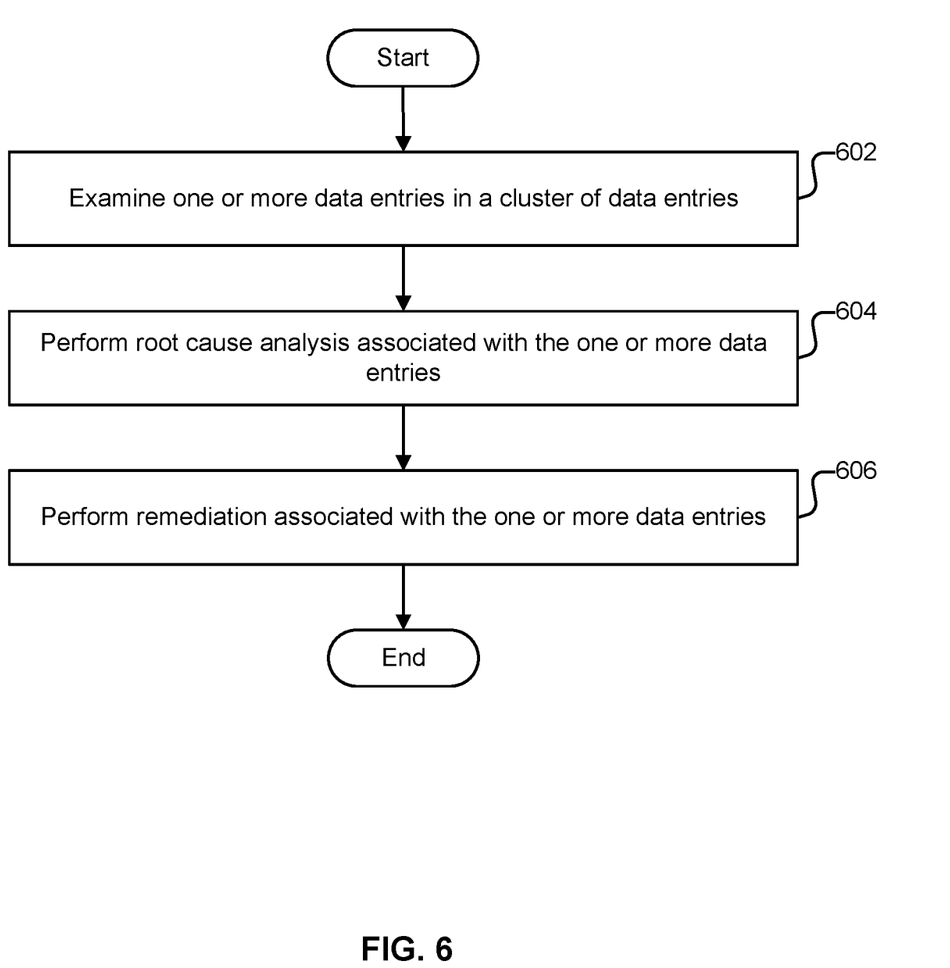
FIG. 6 is a flow chart illustrating an embodiment of a process for performing remediation associated with machine generated data entries.

FIG. 6 is a flow chart illustrating an embodiment of a process for performing remediation associated with machine generated data entries. In some embodiments, the process of FIG. 6 is performed by RCA and remediation server 114 of FIG. 1. In some embodiments, at least a portion of the process of FIG. 6 is performed in 206 of FIG. 2.

At 602, one or more data entries in a cluster of data entries are examined. In various embodiments, the data entries are error and/or warning messages. In many scenarios, a large volume (e.g., hundreds of thousands) of errors and warnings are generated through error/warning discovery logs. In some embodiments, the one or more data entries are examined by a user through a user interface. With respect to error patterns, various attributes, such as a first occurred date, last occurred date, number of occurrences, and CIs that are affected may be examined through the user interface. The user may select an error whose type has occurred very frequently to further investigate and remediate. The first occurrence of an error can be useful to determine where the error originated. The last occurrence can be useful to determine what remediations have been successful. Affected CIs can be useful to determine where to start remediation. In some embodiments, affected CIs are identified through the pre-processing that removes CI names. The user is able to manage the large volume of errors and warnings because they have been clustered into a manageable number of types (of error patterns), which makes it easier to select top errors for RCA and remediation.

In some embodiments, error/warning logs occurring each day are assigned into their respective clusters and patterns and a count of occurrences is updated every day. Computer scripts can be written to extract affected CIs from logs for each pattern type. The first occurred date for each pattern is maintained, which aids identification of errors that began after events such as upgrades. In various embodiments, the last occurred date is updated during a daily scan, which aids identification of error patterns that have been addressed and fixed.

At 604, RCA associated with the one or more data entries is performed. In some embodiments, performing RCA includes collecting various inputs and providing the inputs to an RCA engine. The various inputs can include error messages indicating faults and symptoms. The various inputs can be collected by various hardware and software sensors measuring properties such as network speed, storage capacity, hardware failures, component connectivity, etc. Collection of error messages based on monitoring by hardware and/or software sensors is referred to as error discovery (or simply discovery). In some embodiments, the RCA engine compares collected symptoms to a symptom model and fault/cause model to determine a cause of the symptoms. For example, symptoms such as low network bandwidth and poor connectivity at specific nodes in a network may be determined by the RCA engine to be caused by a specific computer in the network.

At 606, remediation associated with the one or more data entries is performed. Example remediations include: stopping a software process, ending the software process, killing the software process, restarting a device or server, updating a hardware configuration, and dispatching a technician. In some embodiments, remediation starts with a user selecting one or more affected CIs to address.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving machine generated data entries;
clustering the machine generated data entries into a plurality of different clusters that each includes a different corresponding subset of the received machine generated data entries;
for each of the plurality of different clusters, analyzing content of the corresponding subset of the received machine generated data entries belonging to the corresponding cluster of the plurality of different clusters to determine a corresponding pattern of the corresponding cluster;
receiving a new machine generated data entry;
matching the new machine generated data entry to one of the determined patterns corresponding to a specific cluster of the plurality of different clusters; and
determining to include the new machine generated data entry in the specific cluster including the corresponding subset of the received machine generated data entries.

2. The method of claim 1, wherein the machine generated data entries comprise textual data.

3. The method of claim 1, wherein the machine generated data entries comprise information technology error messages.

4. The method of claim 3, further comprising performing root cause analysis associated with at least a portion of the information technology error messages.

5. The method of claim 3, further comprising performing remediation associated with at least a portion of the information technology error messages.

6. The method of claim 1, wherein clustering the machine generated data entries includes removing at least one of the following: a punctuation, a number, a specified non-alphabetic character, or an alphanumeric word.

7. The method of claim 1, wherein clustering the machine generated data entries includes removing names of information technology assets.

8. The method of claim 1, wherein clustering the machine generated data entries includes separating textual data into individual lexical units.

9. The method of claim 1, wherein clustering the machine generated data entries includes determining a numerical representation for each of the machine generated data entries.

10. The method of claim 9, wherein the numerical representation is a vector comprising a corresponding value for each individual lexical unit in a corresponding machine generated data entry.

11. The method of claim 10, wherein the corresponding value is a numerical statistic that is proportional to a count of a corresponding word token within a specified subgroup of the machine generated data entries and inversely proportional to a count of the corresponding word token across all the machine generated data entries.

12. The method of claim 9, further comprising calculating distances, according to a specified distance metric, between the numerical representations.

13. The method of claim 12, further comprising grouping the numerical representations such that numerical representations that are close to one another according to the specified distance metric are assigned to distinct subgroups.

14. The method of claim 1, wherein the corresponding pattern of the corresponding cluster is a longest common substring associated with content of the corresponding cluster.

15. The method of claim 1, further comprising storing the determined patterns in a pattern definitions table.

16. The method of claim 1, further comprising receiving a second new machine generated data entry and storing the second new machine generated data entry for further analysis in response to a determination that the second new machine generated data entry does not match to one of the determined patterns.

17. The method of claim 1, further comprising presenting the plurality of different clusters and the determined patterns to a user.

18. The method of claim 1, wherein the machine generated data entries are received from a management, instrumentation, and discovery server.

19. A system, comprising:
one or more processors configured to:
receive machine generated data entries;
cluster the machine generated data entries into a plurality of different clusters that each includes a different corresponding subset of the received machine generated data entries;
for each of the plurality of different clusters, analyze content of the corresponding subset of the received machine generated data entries belonging to the corresponding cluster of the plurality of different clusters to determine a corresponding pattern of the corresponding cluster;
receive a new machine generated data entry;
match the new machine generated data entry to one of the determined patterns corresponding to a specific cluster of the plurality of different clusters; and
determine to include the new machine generated data entry in the specific cluster including the corresponding subset of the received machine generated data entries; and
a memory coupled to at least one of the one or more processors and configured to provide at least one of the one or more processors with instructions.

20. A computer program product embodied in a non-transitory computer readable medium and comprising computer instructions for:
receiving machine generated data entries;
clustering the machine generated data entries into a plurality of different clusters that each includes a different corresponding subset of the received machine generated data entries;
for each of the plurality of different clusters, analyzing content of the corresponding subset of the received machine generated data entries belonging to the corresponding cluster of the plurality of different clusters to determine a corresponding pattern of the corresponding cluster;
receiving a new machine generated data entry;
matching the new machine generated data entry to one of the determined patterns corresponding to a specific cluster of the plurality of different clusters; and
determining to include the new machine generated data entry in the specific cluster including the corresponding subset of the received machine generated data entries.

* * * * *